(12) United States Patent
Suita

(10) Patent No.: US 11,433,714 B2
(45) Date of Patent: Sep. 6, 2022

(54) PNEUMATIC TIRE

(71) Applicant: Toyo Tire Corporation, Itami (JP)

(72) Inventor: Harunobu Suita, Itami (JP)

(73) Assignee: TOYO TIRE CORPORATION, Itami (JP)

(*) Notice: Subject to any disclaimer, the term of this patent is extended or adjusted under 35 U.S.C. 154(b) by 186 days.

(21) Appl. No.: 16/853,837

(22) Filed: Apr. 21, 2020

(65) Prior Publication Data
US 2020/0361247 A1 Nov. 19, 2020

(30) Foreign Application Priority Data

May 14, 2019 (JP) .............................. JP2019-091135

(51) Int. Cl.
B60C 11/13 (2006.01)
B60C 11/03 (2006.01)

(52) U.S. Cl.
CPC ...... *B60C 11/1353* (2013.01); *B60C 11/1307* (2013.01); *B60C 2011/0348* (2013.01); *B60C 2011/0353* (2013.01); *B60C 2011/0397* (2013.01)

(58) Field of Classification Search
CPC ...................................................... B60C 11/01
See application file for complete search history.

(56) References Cited

U.S. PATENT DOCUMENTS

| 4,724,878 | A | * | 2/1988 | Kabe | ........................ | B60C 11/00 |
| | | | | | | 152/209.27 |
| 2008/0251179 | A1 | * | 10/2008 | Nakamura | .......... | B60C 11/1281 |
| | | | | | | 152/454 |
| 2010/0116395 | A1 | | 5/2010 | Andou | | |
| 2018/0134091 | A1 | | 5/2018 | Yokomakura | | |
| 2018/0147894 | A1 | | 5/2018 | Haseda | | |

FOREIGN PATENT DOCUMENTS

| CN | 108099504 A | 6/2018 | |
| JP | 2002079809 A * | 3/2002 | ......... B60C 11/0309 |
| JP | 2012162135 A * | 8/2012 | |
| JP | 2014-213835 A | 11/2014 | |

(Continued)

OTHER PUBLICATIONS

Machine Translation: JP-2012162135-A, Kato H, (Year: 2022).*

(Continued)

*Primary Examiner* — Kendra Ly
(74) *Attorney, Agent, or Firm* — WHDA, LLP

(57) ABSTRACT

A pneumatic tire in the present invention has a narrow groove extending in the tire circumferential direction on a portion closer to a tire equator than a ground contact end, and dividing a shoulder land into a main land close to the tire equator and a sub land close to the ground contact end. An outer sidewall of the narrow groove has: a straight line extending inward in a tire radial direction from an outer circumferential surface of the sub land; a first circular arc smoothly connected to the straight line; and a second circular arc smoothly connected to a groove bottom of the narrow groove. The first circular arc has a center of a circular arc closer to the equator than the outer sidewall. The second circular arc has a center of a circular arc closer to an outside in a tire width direction than the outer sidewall.

10 Claims, 4 Drawing Sheets

(56) References Cited

FOREIGN PATENT DOCUMENTS

| | | | |
|---|---|---|---|
| JP | 2018-79767 A | | 5/2018 |
| KR | 2010068540 A | * | 6/2010 |
| WO | 2008/111582 A1 | | 9/2008 |

OTHER PUBLICATIONS

Machine Translation: JP-2002079809-A, Fujiwara H, (Year: 2022).*
Machine Translation: KR-2010068540-A, Bae S, (Year: 2022).*
Office Action dated Apr. 29, 2022, issued in counterpart CN Application No. 202010098745.1, with English Translation. (20 pages).

* cited by examiner

PNEUMATIC TIRE

BACKGROUND OF THE INVENTION

Field of the Invention

The present disclosure relates to a pneumatic tire in which a narrow groove is provided in a vicinity of a ground contact end of a shoulder land of a tread surface.

Description of the Related Art

In a running pneumatic tire, generally, a ground contact pressure tends to increase in a vicinity of a ground contact end of a shoulder land of a tread surface. As a result, irregular wear sometimes matters. The irregular wear is a phenomenon in which an amount of wear becomes larger in the vicinity of the ground contact end of the shoulder land than in other lands of the tread surface. As a method for preventing such irregular wear, it is widespread to provide a narrow groove, which extends in a tire circumferential direction in an inside of the ground contact end of the shoulder land of the tread surface in a tire width direction, in the vicinity of the ground contact end. This narrow groove is also referred to as a "differential groove".

Patent Documents 1 to 3 disclose pneumatic tires, each of which has such a narrow groove on a shoulder land. The narrow groove disclosed in each of the documents divides a shoulder land into a main land close to a tire equator and a sub land close to the ground contact end, in which a groove bottom of the narrow groove swells inward in the tire width direction. Thus, a ground contact pressure of the main land at a portion close to the narrow groove is reduced, and a ground contact pressure in the main land is made even, whereby the irregular wear of the shoulder land is suppressed.

PRIOR ART DOCUMENTS

Patent Documents

Patent Document 1: JP-A-2014-213835
Patent Document 2: WO 2008/111582 A1
Patent Document 3: JP-A-2018-079767

SUMMARY OF THE INVENTION

However, when the narrow groove that extends in the tire circumferential direction is provided on the shoulder land, a crack is sometimes formed from a vicinity of the groove bottom of the narrow groove following use of the tire. This crack is called a groove bottom crack. The groove bottom crack is broadly divided into: a groove bottom crack that extends from a vicinity of the groove bottom inward in a tire radial direction; and a groove bottom crack formed from the vicinity of the groove bottom outward (toward a wall) in the tire width direction so as to traverse the sub land.

FIG. 4 illustrates an example of a conventional narrow groove by a cross section taken along the tire width direction. A narrow groove 90 divides a shoulder land 83 into a main land 81 close to a tire equator and a sub land 82 close to a ground contact end TE. The narrow groove 90 is composed of: an inner sidewall 91 located relatively inward in the tire width direction; an outer sidewall 92 located relatively outward in the tire width direction; and a groove bottom 93 having one end connected to the inner sidewall 91 and the other end connected to the outer sidewall 92. The outer sidewall 92 is formed of a substantially straight line, the groove bottom 93 is formed of a curve in which a plurality of circular arcs are combined with one another, and a connection point 94 at which such a substantially linear outer sidewall 92 is connected to such a curved groove bottom 93 can be said to be a bend starting point.

The bend starting point at which the straight line is connected to such a curve is liable to receive concentration of a strain during running, and is liable to become a starting point of the crack. Hence, in the narrow groove 90 of FIG. 4, a groove bottom crack CR is generated following use of the tire. The groove bottom crack CR extends outward in the tire width direction from the connection point 94 that is the bend starting point at which the straight line is connected to the curve. When the groove bottom crack CR is generated, the sub land 82 chips due to deformation received during running, and such an irregular wear suppression effect brought by the narrow groove 90 is sometimes lost.

Moreover, the narrow groove is formed by a protrusion, which is provided in a mold, when the tire is vulcanized and molded. Therefore, when the narrow groove has a shape in which a groove bottom swells inward in the tire width direction like the narrow groove 90, there increases resistance at a time when the protrusion is drawn out of the narrow groove 90 at a demolding time of drawing out the tire from the mold, and there has been a problem that the protrusion is thereby deformed and damaged. Hence, in the narrow groove having such a shape, it is necessary to take demolding properties into consideration.

It is an object of the present disclosure to, in the pneumatic tire in which the narrow groove is provided in the vicinity of the ground contact end of the shoulder land of the tread surface, suppress the generation of the groove bottom crack, which is generated from the vicinity of the groove bottom of the narrow groove, while maintaining the demolding properties from the narrow groove.

A pneumatic tire according to the present disclosure has the following features. That is, the pneumatic tire includes:
a shoulder land provided on a tread surface and extending in a tire circumferential direction; and
a narrow groove provided on the tread surface, extending in the tire circumferential direction on a portion closer to a tire equator than a ground contact end of the shoulder land, and dividing the shoulder land into a main land close to the tire equator and a sub land close to the ground contact end,
wherein an outer sidewall of the narrow groove has: a straight line extending inward in a tire radial direction from an outer circumferential surface of the sub land; a first circular arc smoothly connected to the straight line; and a second circular arc smoothly connected to a groove bottom of the narrow groove, and
wherein the first circular arc has a center of a circular arc closer to the tire equator than the outer sidewall, and the second circular arc has a center of a circular arc closer to an outside in a tire width direction than the outer sidewall.

According to the present disclosure provided with the above configuration, the outer sidewall of the narrow groove has the second circular arc smoothly connected to the groove bottom, and accordingly, a connection point at which the outer sidewall is connected to the groove bottom is not a bend starting point. Therefore, a strain that acts on the narrow groove during running is likely to be dispersed, and the groove bottom crack can be suppressed, which extends outward in the tire width direction from the connection point taken as a starting point, at which the outer sidewall is connected to the groove bottom. Moreover, due to the second circular arc having the center of the circular arc closer to the outside in the tire width direction than the outer sidewall, a width of the sub land in the tire width direction in a vicinity of a depth position of the second circular arc is increased, rigidity of the sub land is improved, and the generation of the groove bottom crack extending outward in the tire width direction can be suppressed.

Moreover, according to the present disclosure provided with the above configuration, the outer sidewall of the narrow groove has the first circular arc smoothly connected to the straight line extending inward in the tire radial direction from the outer circumferential surface of the sub land, and accordingly, a groove width at a depth position of the first circular arc is increased, and the demolding properties from the narrow groove can be maintained.

Each of curvature radii of the first circular arc and the second circular arc is preferably larger than 3 mm and smaller than 12 mm. When the curvature radii of the first circular arc and the second circular arc remain within such a range, the strain that acts on the outer sidewall of the narrow groove is appropriately dispersed while effectively maintaining the demolding properties from the narrow groove, and such an effect of suppressing the generation of the groove bottom crack can be obtained satisfactorily.

The groove bottom is preferably composed of a single circular arc. The groove bottom having a single circular arc takes a constant and large curvature radius, and accordingly, has a high dispersion effect for the strain. Hence, the generation of the groove bottom crack can be suppressed.

An inner sidewall of the narrow groove preferably includes a straight line extending inward in the tire radial direction from an outer circumferential surface of the main land, and, when an interval between the straight line of the outer sidewall and the straight line of the inner sidewall is L1, and a maximum space dimension of the groove bottom in the tire width direction is L2, $1.5 \leq L2/L1 \leq 2.3$ is preferably established. When the narrow groove satisfies this numerical value range, the strain that acts on the groove bottom of the narrow groove is appropriately dispersed while maintaining the demolding properties from the narrow groove, and the effect of suppressing the generation of the groove bottom crack can be obtained satisfactorily.

An inner sidewall of the narrow groove is preferably composed of: a straight line extending inward in the tire radial direction from an outer circumferential surface of the main land; and a third circular arc in which one end is smoothly connected to the straight line and other end is smoothly connected to the groove bottom, and a curvature radius of the third circular arc is preferably smaller than a curvature radius of the first circular arc and a curvature radius of the second circular arc. The curvature radius of the third circular arc is set smaller than the curvature radius of the first circular arc and the curvature radius of the second circular arc, whereby a groove width at a depth position of the third circular arc is increased, and the demolding properties from the narrow groove can be improved. Moreover, since the curvature radius of the groove bottom can be increased, the generation of the groove bottom crack mainly extending inward in the tire radial direction from the vicinity of the groove bottom can be suppressed.

The outer sidewall may include an intermediate straight line in which one end is smoothly connected to the first circular arc and other end is smoothly connected to the second circular arc. Thus, a degree of freedom in design for suppressing the generation of the groove bottom crack is increased while maintaining the demolding properties.

DETAILED DESCRIPTION OF THE PREFERRED EMBODIMENT

Figure 1:
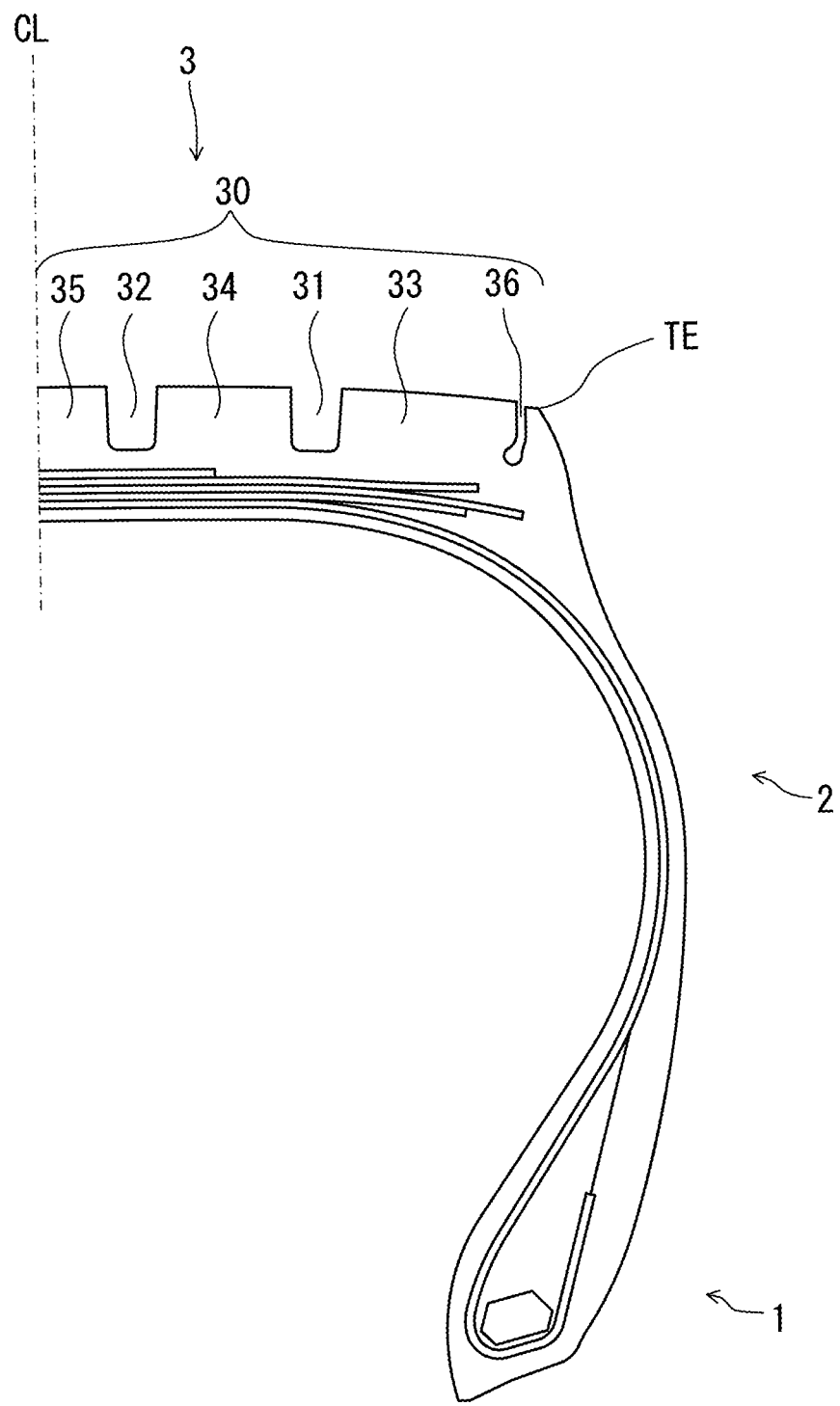
FIG. 1 is a half cross-sectional view of a tire meridian, illustrating an example of a pneumatic tire.

FIG. 1 illustrates an example of a pneumatic tire according to this embodiment by a half cross section of a meridian, which is taken along a tire width direction. Since a main shape of the pneumatic tire is similar between both sides with respect to a tire equator CL, FIG. 1 illustrates only one side with respect to the tire equator CL. The tire includes: a pair of beads 1; sidewalls 2, each of which extends outward in a tire radial direction from each of the beads 1; and a tread 3 continuous with outer ends of the respective sidewalls 2 in the tire radial direction. A tread pattern is formed on a tread surface 30 that is an outer circumferential surface of the tread 3. This tread pattern includes: a plurality of main grooves (31, 32) which extend in a tire circumferential direction; and a plurality of lands (33 to 35) separated by the main grooves (31, 32) and a ground contact end TE.

A groove width of the main grooves (31, 32) is, for example, 6 mm to 14 mm. A value of the groove width is measured at an opening on the tread surface 30. For the plurality of lands (33 to 35), a variety of shapes such as ribs and blocks can be adopted. Among the plurality of lands (33 to 35), the land 33 sandwiched between the ground contact end TE and the main groove 31 located on the outermost side in the tire width direction is a shoulder land. In the shoulder land 33 in a vicinity of the ground contact end TE, which is a portion inside from the ground contact end TE in the tire width direction, a narrow groove 36 that extends in the tire circumferential direction is provided. A groove width of the narrow groove 36 is smaller than the groove width of the main groove 31 located on the outermost side in the tire width direction.

Figure 2:
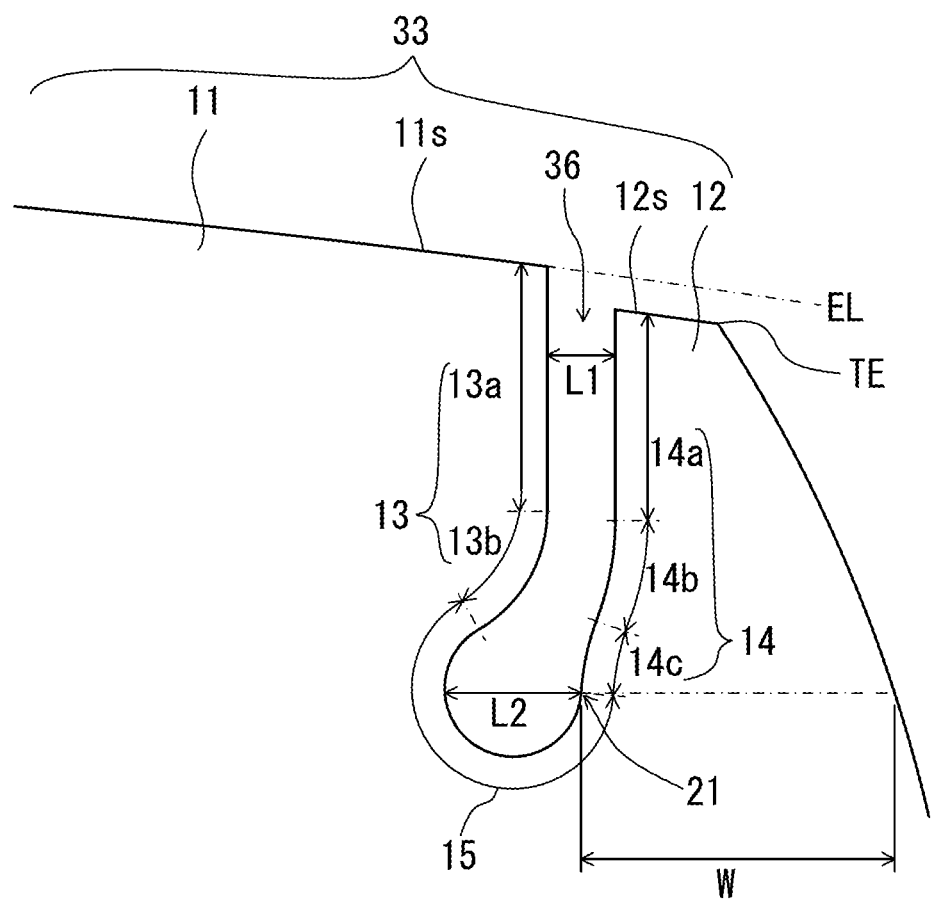
FIG. 2 is an enlarged view of a narrow groove in FIG. 1.

FIG. 2 is an enlarged view of the narrow groove 36 in FIG. 1. The narrow groove 36 divides the shoulder land 33 that extends in the tire circumferential direction into a main land 11 closer to the tire equator CL than the narrow groove 36 and a sub land 12 closer to the ground contact end TE than the narrow groove 36. An outer circumferential surface 12s of the sub land 12 may be located inside in the tire radial direction from an extended line EL drawn by extending the outer circumferential surface 11s of the main land 11 outward in the tire width direction, or may be located on the extended line EL. In this embodiment, design is made so that the outer circumferential surface 12s is located inside in the tire radial direction from the extended line EL, whereby a ground contact pressure is uniformed between the main land 11 and the sub land 12.

When viewed on the tire meridian cross section taken along the tire width direction, the narrow groove 36 is divided into an inner sidewall 13 that constitutes the main land 11, an outer sidewall 14 that constitutes the sub land 12, and a groove bottom 15. The inner sidewall 13 is located relatively inside in the tire width direction, and the outer sidewall 14 is located relatively outside in the tire width direction. The inner sidewall 13 connects the outer circumferential surface 11s of the main land 11 and the groove bottom 15 to each other. The outer sidewall 14 connects the outer circumferential surface 12s of the sub land 12 and the groove bottom 15 to each other. One end of the groove bottom 15 is connected to the inner sidewall 13, and the other end of the groove bottom 15 is connected to the outer sidewall 14. In this embodiment, the groove bottom 15 of the narrow groove 36 has a shape of swelling toward the tire equator CL.

The outer sidewall 14 includes: a straight line 14a that extends inward in the tire radial direction from the outer circumferential surface 12s of the sub land 12; a first circular arc 14b smoothly connected to the straight line 14a; and a second circular arc 14c smoothly connected to the groove bottom 15. In this embodiment, the straight line 14a extends in a direction perpendicular to a rotation axis of the tire. However, if the straight line 14a extends inward in the tire radial direction, for example, in a direction in which the straight line 14a intersects the outer circumferential surface 12s perpendicularly, then the extension direction of the straight line 14a does not need to be the direction perpendicular to the rotation axis of the tire.

The first circular arc 14b has a center of a circular arc closer to the tire equator than the outer sidewall 14. That is, the first circular arc 14b is curved so as to protrude outward in the tire width direction. The second circular arc 14c has a center of a circular arc closer to the outside in the tire width direction than the outer sidewall 14. That is, the second circular arc 14c is curved so as to protrude inward in the tire width direction. Each of the first circular arc 14b and the second circular arc 14c is located inside in the tire width direction from the straight line 14a (extended line of the straight line 14a inward in the tire radial direction).

The outer sidewall 14 has an end portion smoothly connected to the groove bottom 15 at a connection point 21, and this end portion is composed of the second circular arc 14c. Hence, the connection point 21 between the outer sidewall 14 and the groove bottom 15 is not a bend starting point at which a straight line is connected to a curve, but just an inflection point at which a bending direction changes. Therefore, a strain that acts on the groove bottom 15 of the narrow groove 36 during running is likely to be dispersed without being concentrated on the connection point 21. Moreover, a curvature radius of the groove bottom 15 can be increased by providing the second circular arc 14c.

Further, the first circular arc 14b has a center of the circular arc closer the tire equator than the outer sidewall 14, and accordingly, by providing the first circular arc 14b, a groove width at a depth position in the first circular arc 14b is increased, and demolding properties from the narrow groove 36 can be maintained.

It is preferable that each of curvature radii of the first circular arc 14b and the second circular arc 14c be larger than 3 mm. Thus, demolding properties from the narrow groove 36 are maintained effectively, concentration of a strain on the first circular arc 14b and the second circular arc 14c can be relieved satisfactorily.

It is more preferable that the curvature radius of the first circular arc 14b be smaller than 12 mm. Thus, the demolding properties from the narrow groove 36 can be improved appropriately. Moreover, a thickness W of the sub land 12 in a vicinity of the groove bottom 15 is increased, rigidity of the sub land 12 is improved, and the strain can be dispersed. In addition, the narrow groove 36 is curved with respect to the tire radial direction, and accordingly, an effect of inhibiting intrusion of a stone, which enters the narrow groove 36, to the groove bottom 15 (that is, an effect of improving stone holding resistance) is obtained.

It is preferable that the curvature radius of the second circular arc 14c be smaller than 12 mm. Thus, the strain concentrated to the connection point 21 between the second circular arc 14c and the groove bottom 15 can be dispersed effectively.

It is preferable that the curvature radius of the first circular arc 14b and the curvature radius of the second circular arc 14c be values approximate to each other, and for example, a difference between the curvature radius of the first circular arc 14b and the curvature radius of the second circular arc 14c be 1.2 mm or less.

In this embodiment, the groove bottom 15 is formed of a single circular arc. That is, the groove bottom 15 is composed of a single circular arc in which a center of the circular arc and a curvature radius are the same. The groove bottom 15 is composed of such a single circular arc, whereby the strain that acts on the groove bottom 15 can be dispersed satisfactorily. The single circular arc that composes the groove bottom 15 preferably has a length of a half circumference or more.

The inner sidewall 13 includes a straight line 13a that extends inward in the tire radial direction from the outer circumferential surface 11s of the main land 11. When an interval between the straight line 14a of the outer sidewall 14 and the straight line 13a of the inner sidewall 13 in the tire width direction is L1, and a maximum space dimension of the groove bottom 15 in the tire width direction is L2, it is preferable that L2/L1 be 1.5 or more and 2.3 or less. Here, when the circular arc of the groove bottom 15 is such a single circular arc having a length of a half circumference or more, the maximum space dimension corresponds to a diameter of the circular arc. When L2/L1 remains within the numerical value range described above, the strain that acts on the groove bottom 15 can be dispersed appropriately while maintaining the demolding properties from the narrow groove 36.

In this embodiment, the inner sidewall 13 is composed of: the straight line 13a; and a third circular arc 13b in which one end is smoothly connected to the straight line 13a and the other end is smoothly connected to the groove bottom 15. A center of a circular arc of the third circular arc 13b is located closer to the tire equator than the inner sidewall 13. Therefore, the third circular arc 13b is curved so as to protrude outward in the tire width direction. The connection of the inner sidewall 13 to the groove bottom 15 is formed into a circular arc shape, whereby a strain that acts on the third circular arc 13b can be dispersed.

A curvature radius of the third circular arc 13b is preferably set smaller than the curvature radius of the first circular arc 14b and the curvature radius of the second circular arc 14c. Thus, a groove width at a depth position of the third circular arc 13b is increased, and the demolding properties from the narrow groove 36 can be improved. Moreover, a connection point at which the third circular arc 13b is connected to the groove bottom 15 can be shifted inward in the tire width direction (toward the tire equator), and the curvature radius of the groove bottom 15 can be increased. Further, the center of the circular arc of the third circular arc 13b is preferably located outside in the tire radial direction more than the center of the circular arc of the first circular arc 14b. Thus, the curvature radius of the groove bottom 15 can be increased. When the curvature radius of the groove bottom 15 is increased, generation of a groove bottom crack can be suppressed, and the demolding properties from the narrow groove 36 are improved.

In the narrow groove 36 of FIG. 2, the first circular arc 14b and the second circular arc 14c are directly connected to each other. Hence, a straight line is not interposed between the groove bottom 15 and the second circular arc 14c, and accordingly, the strain can be dispersed more effectively.

Figure 3:
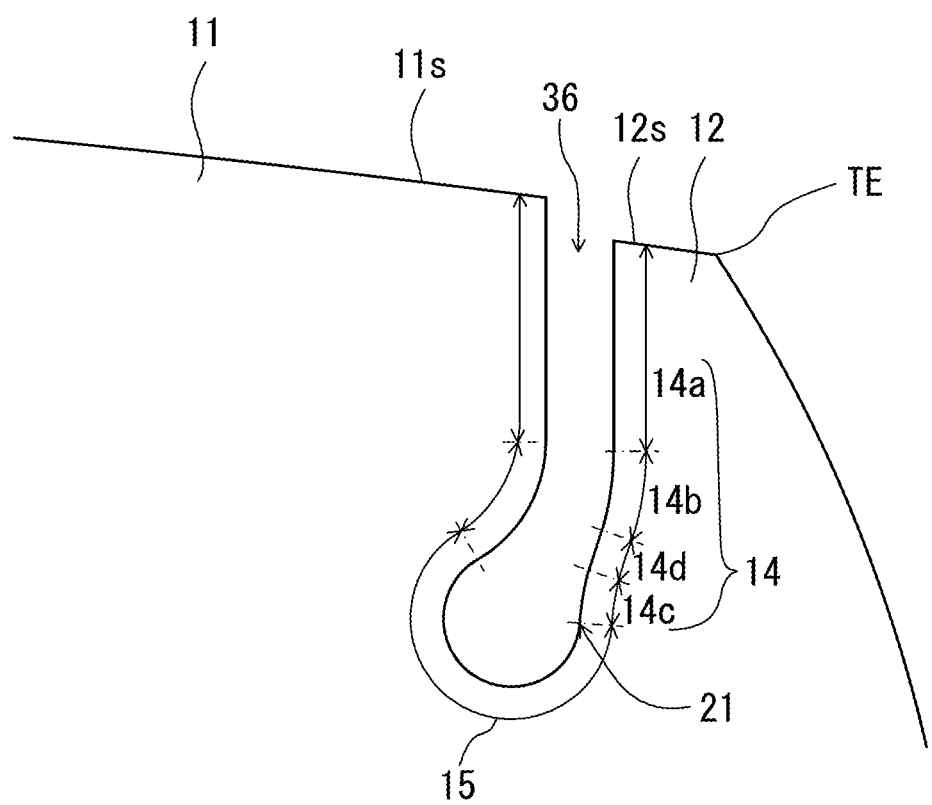
FIG. 3 is a cross-sectional view illustrating an example of a narrow groove having an intermediate straight line.
Figure 4:
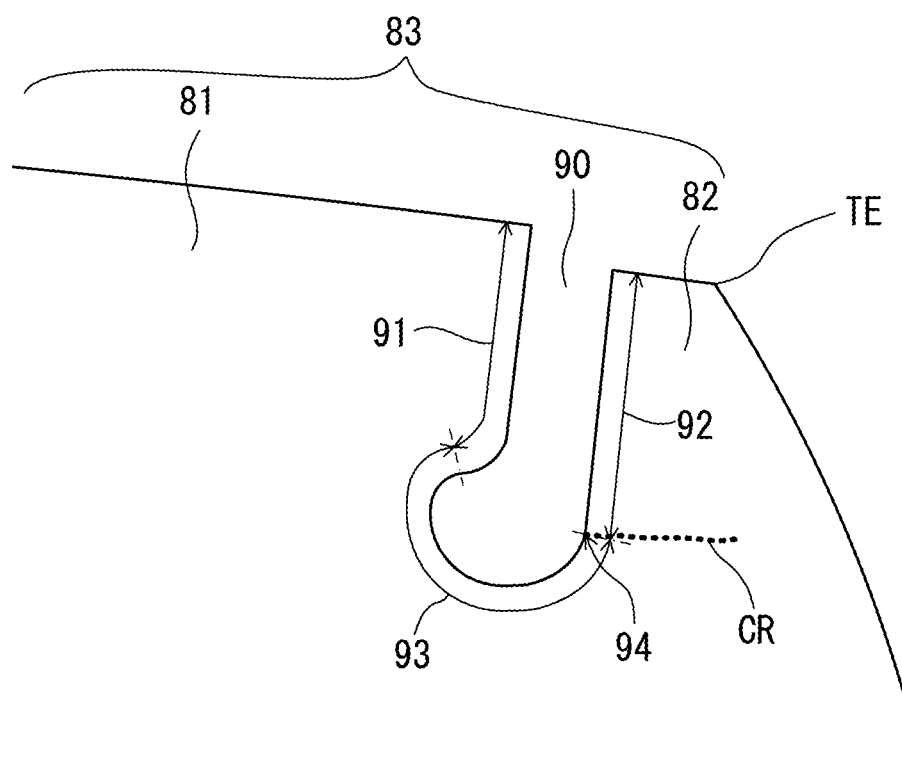
FIG. 4 is a cross-sectional view illustrating an example of a conventional narrow groove shape in which a groove bottom swells.

Meanwhile, a narrow groove 36 of FIG. 3 has an intermediate straight line 14d between the first circular arc 14b and the second circular arc 14c. Even if the narrow groove 36 has the intermediate straight line 14d, a more satisfactory strain dispersion effect than in the conventional narrow groove is obtained since the second circular arc 14c is connected to the groove bottom 15. Moreover, by the fact that the narrow groove 36 has the intermediate straight line 14d, restrictions regarding the design of the narrow groove are reduced, and a degree of freedom in the design for maintaining the demolding properties is increased. For example, the groove bottom 15 can be moved more inward in the tire radial direction, or the space of the groove bottom 15 can be further increased. In order to suppress the generation of the groove bottom crack, a length of the intermediate straight line 14d is preferably set to 1.5 mm or less for example, and the intermediate straight line 14d is preferably disposed more inward in the tire radial direction than the center of the circular arc of the third circular arc 13b.

The present disclosure is not limited to the above-mentioned embodiment, and various modifications and variations may be made to the present disclosure without departing from the spirit of the present disclosure.

What is claimed is:

1. A pneumatic tire comprising:
   a shoulder land provided on a tread surface and extending in a tire circumferential direction; and
   a narrow groove provided on the tread surface, extending in the tire circumferential direction on a portion closer to a tire equator than a ground contact end of the shoulder land, and dividing the shoulder land into a main land close to the tire equator and a sub land close to the ground contact end,
   wherein an outer sidewall of the narrow groove has: a straight line extending inward in a tire radial direction from an outer circumferential surface of the sub land; a first circular arc smoothly connected to the straight line; and a second circular arc smoothly connected to a groove bottom of the narrow groove,
   wherein the first circular arc has a center of a circular arc closer to the tire equator than the outer sidewall, and the second circular arc has a center of a circular arc closer to an outside in a tire width direction than the outer sidewall,
   wherein an inner sidewall of the narrow groove has: a straight line extending inward in the tire radial direction from an outer circumferential surface of the main land; and a third circular arc in which one end is smoothly connected to the straight line and other end is smoothly connected to the groove bottom, and
   wherein a curvature radius of the third circular arc is smaller than a curvature radius of the first circular arc and a curvature radius of the second circular arc.

2. The pneumatic tire according to claim 1, wherein a curvature radius of the first circular arc is larger than 3 mm and smaller than 12 mm.

3. The pneumatic tire according to claim 1, wherein a curvature radius of the second circular arc is larger than 3 mm and smaller than 12 mm.

4. The pneumatic tire according to claim 1, wherein a difference between a curvature radius of the first circular arc and a curvature radius of the second circular arc is 1.2 mm or less.

5. The pneumatic tire according to claim 1, wherein the groove bottom is composed of a single circular arc.

6. The pneumatic tire according to claim 1,
   wherein, when an interval between the straight line of the outer sidewall and the straight line of the inner sidewall is L1, and a maximum space dimension of the groove bottom in the tire width direction is L2,
   $1.5 \leq L2/L1 \leq 2.3$ is established.

7. The pneumatic tire according to claim 1,
   wherein the center of a circular arc of the third circular arc is located closer to the tire equator than the inner sidewall.

8. The pneumatic tire according to claim 1, wherein the first circular arc and the second circular arc are directly connected to each other.

9. The pneumatic tire according to claim 1, wherein the outer sidewall includes an intermediate straight line in which one end is smoothly connected to the first circular arc and other end is smoothly connected to the second circular arc.

10. A pneumatic tire comprising:
    a shoulder land provided on a tread surface and extending in a tire circumferential direction; and
    a narrow groove provided on the tread surface, extending in the tire circumferential direction on a portion closer to a tire equator than a ground contact end of the shoulder land, and dividing the shoulder land into a main land close to the tire equator and a sub land close to the ground contact end,
    wherein an outer sidewall of the narrow groove has: a straight line extending inward in a tire radial direction from an outer circumferential surface of the sub land; a first circular arc smoothly connected to the straight line; and a second circular arc smoothly connected to a groove bottom of the narrow groove,
    wherein the outer sidewall includes an intermediate straight line in which one end is smoothly connected to the first circular arc and other end is smoothly connected to the second circular arc,
    wherein the first circular arc has a center of a circular arc closer to the tire equator than the outer sidewall, and the second circular arc has a center of a circular arc closer to an outside in a tire width direction than the outer sidewall, and
    wherein a length of the intermediate straight line is 1.5 mm or less.

* * * * *